US012780049B2

(12) United States Patent
Popovic et al.

(10) Patent No.: US 12,780,049 B2
(45) Date of Patent: Nov. 3, 2026

(54) EXTENDABLE VEHICLE SEAT SITTING ELEMENT

(71) Applicant: Faurecia Sièges d'Automobile, Nanterre (FR)

(72) Inventors: Ivan Popovic, La Bruyere (FR); Raymonde Odrion, Mélisey (FR)

(73) Assignee: Faurecia Sièges d'Automobile, Nanterre (FR)

(*) Notice: Subject to any disclaimer, the term of this patent is extended or adjusted under 35 U.S.C. 154(b) by 96 days.

(21) Appl. No.: 18/899,314

(22) Filed: Sep. 27, 2024

(65) Prior Publication Data

US 2025/0108733 A1 Apr. 3, 2025

(30) Foreign Application Priority Data

Sep. 29, 2023 (FR) ...................................... 2310421

(51) Int. Cl.

| | |
|---|---|
| ***B60N 2/02*** | (2006.01) |
| ***B60N 2/62*** | (2006.01) |
| ***B60N 2/68*** | (2006.01) |

(52) U.S. Cl.

CPC ............. *B60N 2/0284* (2013.01); *B60N 2/62* (2013.01); *B60N 2/68* (2013.01)

(58) Field of Classification Search

CPC ........... B60N 2/0284; B60N 2/68; B60N 2/62

See application file for complete search history.

(56) References Cited

U.S. PATENT DOCUMENTS

| | | | |
|---|---|---|---|
| 9,616,776 | B1 | 4/2017 | Kondrad et al. |
| 2019/0126794 | A1 | 5/2019 | Yagi et al. |

FOREIGN PATENT DOCUMENTS

| | | | | |
|---|---|---|---|---|
| DE | 10149638 A1 | 4/2003 | |
| EP | 2727764 A1 | 5/2014 | |
| EP | 3763560 A1 * | 1/2021 | ........... B60N 2/0284 |
| KR | 200189158 Y1 * | 8/2000 | ............... B60N 2/68 |

OTHER PUBLICATIONS

French Search Report corresponding to application FR2310421, dated Mar. 21, 2024, 2 pages.

* cited by examiner

*Primary Examiner* — Milton Nelson, Jr.

(74) *Attorney, Agent, or Firm* — Reising Ethington P.C.

(57) ABSTRACT

A vehicle seat sitting element having a main sitting element portion and a movable sitting element portion slidable on a frame between a retracted position and an extended position. The sitting element further includes a covering element extending between the main sitting element portion and the movable sitting element portion, the covering element being movable between a retracted position and a deployed position, wherein the covering element fills the space between the main sitting part and the movable sitting part along the extension direction when the movable sitting part is in the extended position. The covering element is fastened to the frame by an elastic band, exerting a restoring force on the covering element towards the retracted position, when the covering element is in the deployed position.

12 Claims, 6 Drawing Sheets

[Fig. 1]
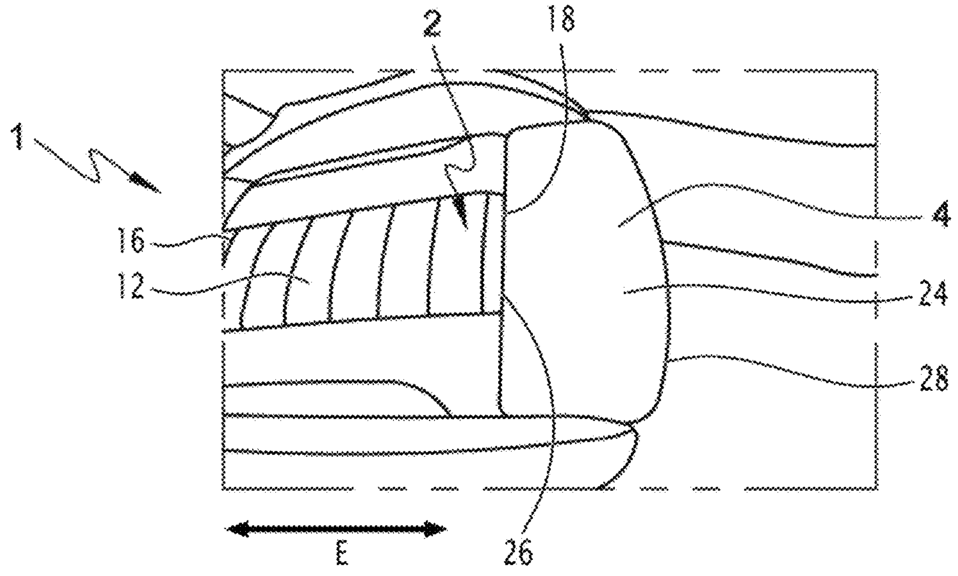

[Fig. 2]
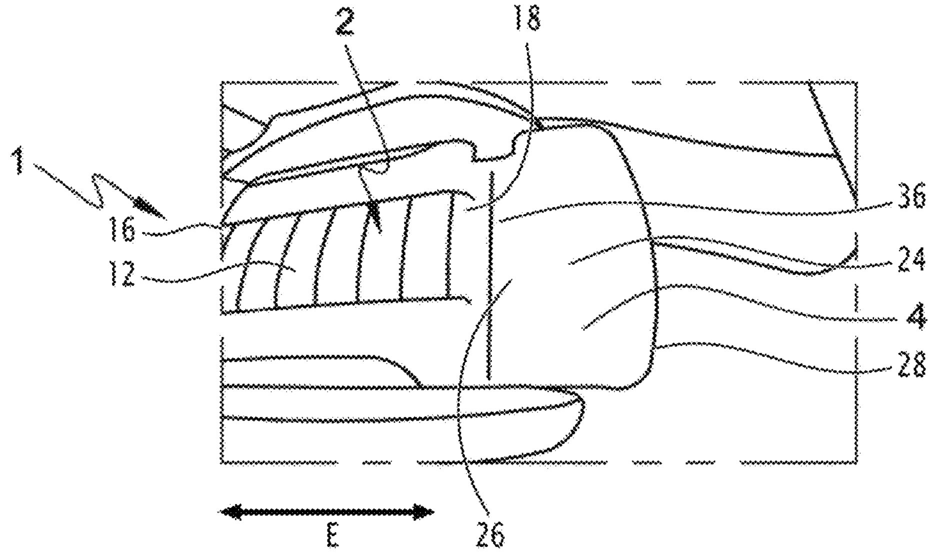

[Fig. 3]
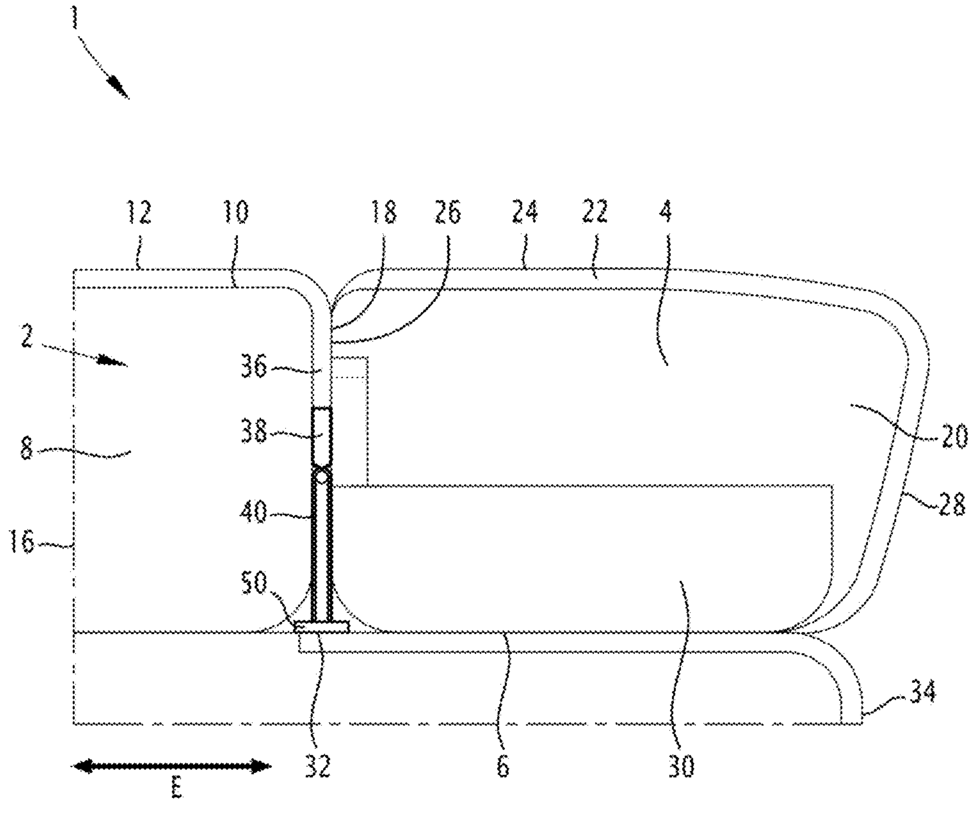

[Fig. 4]
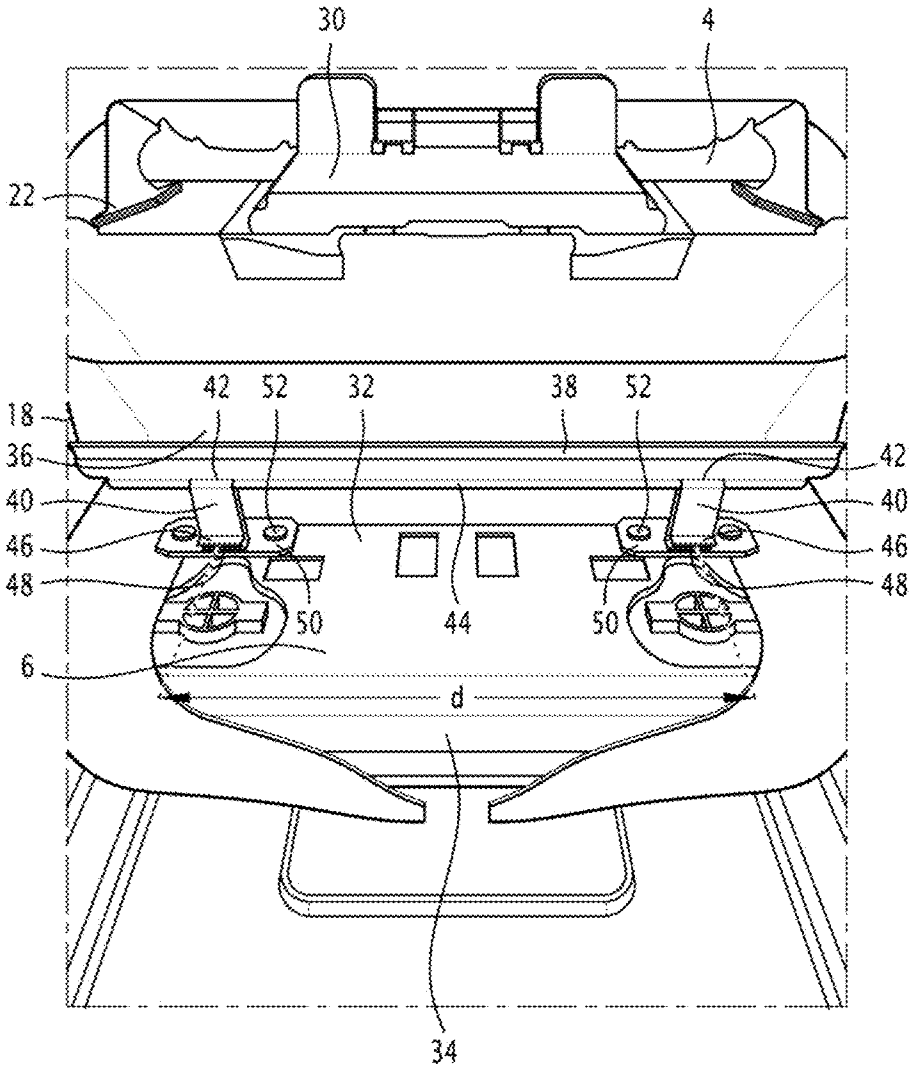

[Fig. 5]
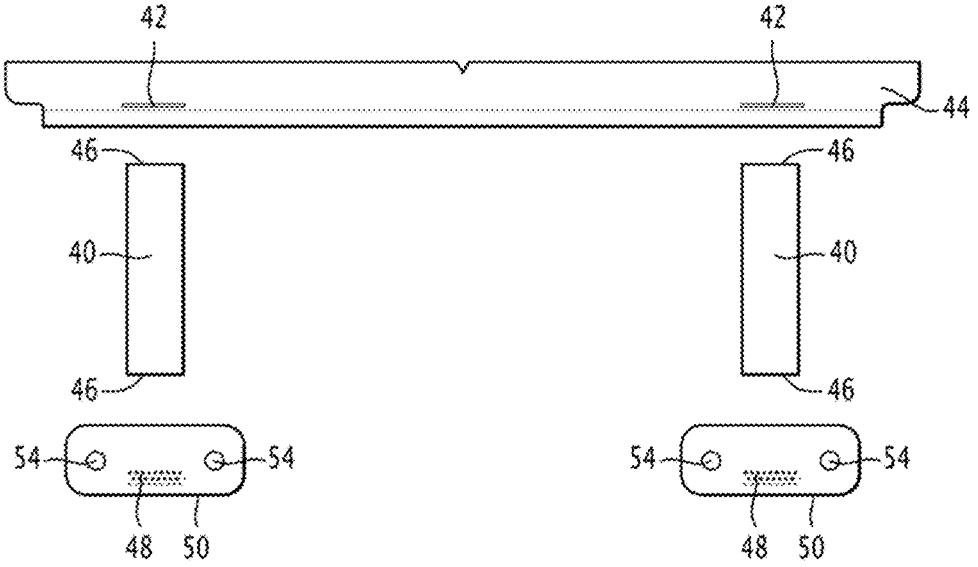

[Fig. 6]
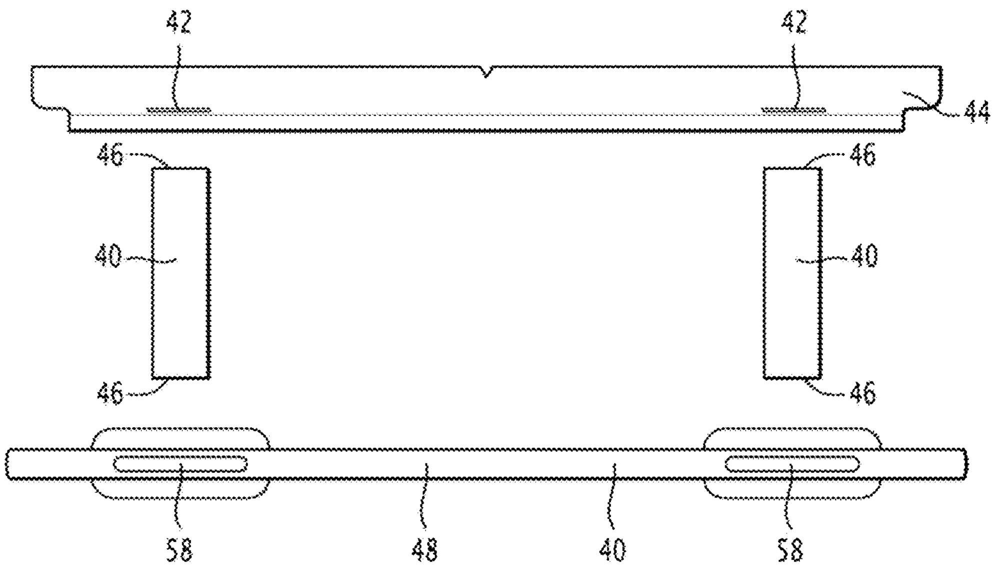

EXTENDABLE VEHICLE SEAT SITTING ELEMENT

TECHNICAL FIELD

The present invention relates to a vehicle seat sitting element, of the type comprising a main sitting part and a movable sitting part, movable relative to the main sitting part in an extension direction between a retracted position, wherein the movable sitting part extends against the main sitting part, and an extended position, wherein the movable sitting part is spaced apart from the main sitting part in the extension direction, said movable sitting part sliding on a frame between the retracted position and the extended position, said frame extending in the extension direction between a rear edge facing the main sitting part and a front edge facing the movable sitting part and spaced from the main sitting part in the extension direction, the seat further comprising a covering element extending between the main sitting part and the movable sitting part, said covering element being movable between a retracted position, wherein the covering element is folded between the main sitting part and the movable sitting part when the movable sitting part is in the retracted position, and an extended position, wherein the covering element fills the space between the main sitting part and the movable sitting part in the extension direction when the movable sitting part is in the extended position.

BACKGROUND

Vehicle seats are known, in particular motor vehicle seats, wherein the sitting element is made in two parts, one of which is movable relative to the other to enable the sitting element surface to be lengthened when the movable sitting part is in an extended position.

The movable sitting part, also known as the sitting element nose, supports the front thighs of a seat occupant to improve seat comfort and, in particular, reduce fatigue on long journeys.

Moving the movable sitting part to the extended position creates a gap between the main sitting part and the movable sitting part, and it is known to fill this gap by means of a covering element to maintain the continuity of the sitting element surface, the covering element extending in continuity with the sitting element surfaces of the main and fixed sitting parts. When the movable sitting part is in a retracted position, wherein it extends against the main sitting part, the covering element is folded between the main sitting part and the movable sitting part so as to extend into the thickness of the sitting element and be invisible from outside the seat.

In order to preserve the comfort and appearance of the sitting element when the movable sitting part is in its retracted position, it is important to ensure that the covering element folds correctly between the main sitting part and the movable sitting part when the movable sitting part moves from its extended position to its retracted position. To achieve this, it is intended that the movable sitting part causes the covering element to move from its deployed position to its retracted position when the movable sitting part moves from its extended position to its retracted position.

However, such a move requires a complex connecting device between the carriage or drawer moving the movable sitting part and the covering element. In addition, such a connection device is generally unable to ensure effective pressing of the covering element against the main sitting part in the retracted position, which can hinder the return of the movable sitting part to its retracted position and prevent the movable sitting part from locking in this retracted position. The quality perceived by the seat occupant is then degraded.

SUMMARY

One of the aims of the invention is to overcome these disadvantages by offering a vehicle seat sitting element comprising a movable sitting part and a covering element offering satisfactory comfort and appearance in all positions of the movable sitting part.

To this end, the invention relates to a vehicle seat sitting element of the aforementioned type, wherein the covering element is secured to the frame, in the vicinity of the rear edge of said frame, by at least one elastic band, said elastic band exerting a restoring force on the covering element towards the retracted position, when said covering element is in the deployed position.

By securing the covering element to the seat frame by means of an elastic band at a point on the frame extending opposite the main sitting part, the restoring force exerted by the elastic band ensures that the covering element is properly pressed against the main sitting part in the retracted position of the covering element, thereby ensuring that the movable sitting part is properly positioned in the retracted position. In addition, the connection between the covering element and the movable sitting part can be simplified, thereby simplifying the structure of the sitting element as a whole.

The vehicle seat sitting element according to the invention may comprise one or more of the following features, taken alone or according to any technically conceivable combination:

- the covering element extends between a rear edge integral with the main sitting part and a front edge integral with the movable sitting part, the elastic band being fastened to the covering element in the vicinity of the front edge of the covering element and being elastically stretched when the covering element moves from the retracted position to the deployed position;
- the elastic band is fastened directly to the frame by at least one fastening pin passing through the elastic band and anchored in the frame;
- the elastic band is engaged in a slot of a rod fixed to the covering element and is fixed by its two ends to a fastening element, said fastening element being fixed to the frame;
- the fastening element is formed by a profile extending between two transverse edges, the ends of the elastic band being fastened to an upper face of said profile between the transverse edges, said profile being fastened to the frame by fastening pins passing through the profile at its transverse edges, a lower face of the profile, opposite the upper face, being applied against the frame;
- the covering element is fastened to the frame by two elastic bands spaced apart in a transverse direction substantially perpendicular to the extension direction;
- the two elastic bands are fastened to the same fastening element, said fastening element being formed by a rod fastened to the seat frame;
- the covering element is made in one piece with a cap of the main sitting part, said covering element folding along a fold line extending between the cap and the covering element from the deployed position to the retracted position;

the covering element is fastened to the movable sitting part so that moving the movable sitting part from the retracted position to the extended position causes the covering element to move from the retracted position to the extended position;

the movable sitting part comprises a carriage translationally mounted on the frame, said carriage moving in the extension direction in a direction from the rear edge to the front edge of the frame when the movable sitting part moves from the retracted position to the extended position;

the elastic band has an elongation at break greater than or equal to 120%.

BRIEF DESCRIPTION OF THE DRAWINGS

Other aspects and advantages of the invention will become clearer on reading the following description, given solely by way of non-limiting example, and made with reference to the drawings, wherein:

FIG. 1 is a schematic perspective view of a vehicle seat sitting element according to an embodiment of the invention, the movable sitting part being in the retracted position, FIG. 2 is a schematic perspective view of a vehicle seat sitting element of FIG. 1, the movable sitting part being in the extended position, FIG. 3 is a schematic cross-sectional perspective view of a vehicle seat sitting element of FIG. 1, the movable sitting part being in the retracted position, FIG. 4 is a schematic perspective view of the interior of a vehicle seat sitting element according to one embodiment of the invention, the movable sitting part being disassembled from the seat frame, FIG. 5 is a schematic exploded view of the device for connecting the covering element to the seat frame of FIG. 4, and FIG. 6 is a schematic exploded view of a device for connecting the covering element to the seat frame according to another embodiment of the invention.

DETAILED DESCRIPTION

With reference to FIGS. 1 to 3, a vehicle seat is described comprising a sitting part 1 having a main sitting part 2 and a movable sitting part 4 mounted on a frame 6. The vehicle seat is, for example, a motor vehicle seat, particularly a motor vehicle front seat. It is understood, however, that the vehicle seat can be used in other types of vehicle, for example sea or air vehicles.

The main sitting part 2 is fixedly mounted on the frame 6, that is to say it does not move relative to it. The main sitting part 2 is conventionally formed by a padding 8 covered by a cover 10, the outer surface 12 of the cover 10 forming a main sitting element surface for a seat occupant. The main sitting part 2 forms the part of the sitting element 1 adjacent to the backrest of the vehicle seat. Thus, the main sitting part 2 is the part of the seat that extends furthest back from the vehicle seat when the vehicle seat is facing the front of the vehicle wherein it is installed. In the description, the terms “front” and “rear” are defined in relation to an extension direction E, corresponding to the front-rear direction of a vehicle when the vehicle seat is facing forward in the vehicle. The main sitting part 2 thus extends between a rear edge 16 adjacent to the backrest and a front edge 18 spaced from the rear edge 16 in the extension direction E. The front edge 16 and rear edge 18 extend in a transverse direction substantially perpendicular to the extension direction E and corresponding to the width of the vehicle wherein the vehicle seat is installed. The thickness of the main sitting part 2 is measured in an elevation direction substantially perpendicular to the extension direction E and to the transverse direction, and corresponds to the sum of the thickness of the padding 8 and the cover 10.

The movable sitting part 4, also known as the sitting element nose, is movably mounted on the frame 6, that is, it can move on the frame 6 and relative to the main sitting part 2. More particularly, the movable sitting part 4 is movable along the extension direction E between a retracted position (FIGS. 1 and 3) and an extended position (FIG. 2), as will be described in greater detail later. The movable sitting part 4 further comprises a padding 20 covered by a cover 22, whose outer surface 24 forms a complementary sitting element surface for the seat occupant. In this way, the main sitting element surface and the complementary sitting element surface together form the complete sitting element surface of the vehicle sitting element 1. To this end, the outer surface 24 of the movable sitting part 4 extends substantially in continuity with the outer surface 12 of the main sitting part 2. The movable sitting part 4 forms the part of the sitting element 1 which is adjacent to the main sitting part 2 in front of it in the extension direction E. Thus, the movable sitting part 4 is the sitting part that extends furthest forward of the vehicle seat when the vehicle seat is turned towards the front of the vehicle wherein it is installed. The movable sitting part 4 extends between a rear edge 26 adjacent to the front edge 18 of the main sitting part 2 and a front edge 28 spaced from the rear edge 26 in the extension direction E, the rear edge 26 and front edge 28 extending in the transverse direction. The thickness of the movable sitting part 4, measured in the elevation direction, corresponds to the sum of the thickness of the padding 20 and the cover 22.

In the retracted position, the movable sitting part 4 extends against the main sitting part 2, that is to say the rear edge 26 of the movable sitting part 4 is applied against the front edge 18 of the main sitting part 2, as shown in the FIGS. 1 and 3. In the extended position, the movable sitting part 4 is spaced apart from the main sitting part 2 in the extension direction E, that is to say there is a gap between the rear edge 26 of the movable sitting part 4 and the front edge 18 of the main sitting part 2, this gap extending in the extension direction E. In other words, in the extended position, the complete sitting element surface of the sitting element 1 is larger than the complete sitting element surface of the sitting element in the retracted position.

The movement of the movable sitting part 4 between the retracted position and the extended position is a translational movement of the movable sitting part 4 on the frame 6 along the extension direction E. More specifically, moving from the retracted position to the extended position is a forward translational movement of the movable sitting part 4 on the frame 6, and moving from the extended position to the retracted position is a rearward translational movement of the movable sitting part 4 on the frame 6. To enable its movements, the movable sitting part 4 comprises a carriage 30, also known as a drawer, slidably mounted on the frame 6, more particularly on one or more rails (not shown) integral with the frame 6 and extending in the extension direction E. The carriage 30 extends into the padding 20 of the movable sitting part 4.

In particular, the frame 6 extends between a rear edge 32 and a front edge 34, extending in the transverse direction and spaced apart from each other in the extension direction E. As shown in FIG. 4, the frame 6 is formed, for example, by a metal plate extending between the rear edge 32 and the front edge 34, this metal plate receiving the movable sitting part 4 and enabling the latter to be moved between the retracted position and the extended position.

The rear edge 32 of the frame 6 extends opposite the main sitting part 2. More particularly, the rear edge 32 of the frame 6 extends, for example, opposite or adjacent the front edge 18 of the main sitting part 2. "Opposite or adjacent" means that the rear edge 32 of the frame 6 extends substantially to the location of the front edge 18 of the main sitting part 2 in the extension direction E. Thus, the position of the rear edge 32 of the frame 6 corresponds substantially to the position of the rear edge 26 of the movable sitting part 4 when the movable sitting part 4 is in the retracted position.

The front edge 34 of the frame 6 extends opposite the movable sitting part 4 in all positions of the movable sitting part 4. More particularly, the front edge 34 of the frame 6 extends opposite or adjacent to the front edge 28 of the movable sitting part 4 when the movable sitting part 4 is in the retracted position and between the rear edge 26 and the front edge 28 of the movable sitting part 4 when the movable sitting part 4 is in the extended position. Thus, in the extended position, part of the movable sitting part 4 extends forward from the frame 6 along the extension direction E, as seen in FIG. 2.

In one embodiment, the distance between the rear edge 32 and the front edge 34 of the frame 6 is substantially equal to the distance between the rear edge 26 and the front edge 38 of the movable sitting part 4, as shown in FIG. 3. Alternatively, the distance between the rear edge 26 and the front edge 38 of the movable sitting part 4 is slightly greater than the distance between the rear edge 32 and the front edge 34 of the frame 6.

The sitting element 1 further comprises a locking device, not shown, for locking the movable sitting part 4 in the retracted position and in the extended position, the locking device being actuated, for example by means of a handle, by the seat occupant to enable the movable sitting part 4 to be positioned in the desired position. According to one embodiment, the movable sitting part 4 can be positioned and locked in a plurality of intermediate positions between the retracted position and the extended position, the movable sitting part 4 being more or less spaced apart from the main sitting part 2 in these intermediate positions.

The sitting element 1 further comprises a covering element 36, or bellows, extending between the main sitting part 2 and the movable sitting part 4 along the extension direction E. More particularly, the covering element 36 is movable between a retracted position, visible in FIGS. 3 and 4, wherein the covering element is folded between the main sitting part 2 and the movable sitting part 4 when the movable sitting part 4 is in the retracted position, and a deployed position, visible in FIG. 2, wherein the covering element 36 fills the space between the main sitting part 2 and the movable sitting part 4 along the extension direction E when the movable sitting part 4 is in the extended position.

In the retracted position, the covering element 36 extends mainly in the elevation direction against the front edge 18 of the main sitting part 2, as more particularly visible in FIG. 3. Thus, in the retracted position, the covering element 36 extends through the thickness of the sitting element 1 and is concealed within the sitting element 1 so that it is not visible from outside the sitting element 1 when the movable sitting part 4 is in the retracted position.

In the deployed position, the covering element 36 extends mainly in the extension direction E between the front edge 18 of the main sitting part 2 and the rear edge 26 of the movable sitting part 4, substantially in continuity with the main sitting element surface and the complementary sitting element surface, so that the complete sitting element surface of the sitting element 1 is continuous and vehicle passengers cannot see the space extending between the main sitting part 2 and the movable sitting part 4 from outside the sitting element 1 when the movable sitting part 4 is in the extended position. The covering element 36 extends between a rear edge 37 integral with the main sitting part 2, more particularly with the front edge 18 of the main sitting part 2 at the cover 10 of the main sitting part 2, and a front edge 38 spaced from the rear edge 37 and integral with the movable sitting part 4.

In one embodiment, the covering element 36 is made of the same piece as the cover 10 of the main sitting part 2. For example, the covering element 36 is formed by an extension of the cover 10 extending beyond the padding 8 of the main sitting part 2 in the extension direction E, this extension of the cover 10 being folded along a fold line extending between the cover 10 and the covering element 36 in the transverse direction from the deployed position to the retracted position. The fold line then forms the rear edge 37 of the lining element 36. In the deployed position, the extension of the cover 10 extends from the outer surface 12 of the cover 10 in the extension direction E to the rear edge 26 of the movable sitting part 4 and, in the retracted position, the cover extension 20 is folded back against the front edge 18 of the main sitting part 2 and extends substantially in the elevation direction. The covering element 36 thus extends from the fold line to the front edge 38. In the deployed position, the front edge 38 extends against the rear edge 26 of the movable sitting part 4 at the cover 22 of the movable sitting part 4 so that the covering element 36 forms a continuous surface with the external surfaces 12 and 24 of the main sitting part 2 and movable sitting part 4. In the retracted position, the front edge 38 is brought closer to the frame 6, as shown in FIG. 4.

The covering element 36 is for example fastened to the movable sitting part 4 so that moving the movable sitting part 4 between the retracted position and the extended position causes the covering element 36 to move from the retracted position to the deployed position. Conversely, moving the movable sitting part 4 from the extended position to the retracted position also results in the covering element 36 moving from the deployed position to the retracted position, but this movement of the covering element 36 is assisted by at least one elastic band 40, which simplifies the connection between the covering element 36 as the pressing of the covering element 36 against the front edge 18 of the main sitting part 2 is ensured by the elastic band 40, as will now be described.

The elastic band 40 is fastened to the covering element 36 on the one hand, and to the frame 6 on the other, in the vicinity of its rear edge 32. The elastic band 40 is arranged to be elastically stretched when the covering element 36 passes from the retracted position to the deployed position and to exert a restoring force on the covering element tending to return the covering element 36 to its retracted position. Thus, "elastic" means that the elastic band 40 can be stretched and elongated in the direction wherein the elastic band 40 extends so as to increase its length and return to its initial length when the force stretching the elastic band 40 ceases to be applied thereto. For example, the elastic band 40 has an elongation at break greater than or equal to 120%, for example substantially between 120% and 350%, which means that the elastic band 40 can be stretched to a length between 120% and 350% of its length when it is unstressed before breaking. In a particular embodiment, the elastic band

40 has an elongation at break close to 300%. According to one embodiment, the elastic band has a maximum tension greater than or equal to 300 N, for example substantially between 300 N and 500 N. According to one embodiment, the force required to elongate the elastic band by 50% is substantially between 9 N and 17 N, for example substantially equal to 13 N. According to one embodiment, the elastic band 40 has a linear mass substantially between 14 $g \cdot m^{-1}$ and 21 $g \cdot m^{-1}$, for example substantially equal to 17.8 $g \cdot m^{-1}$. The elastic band 40 has, for example, a length between 60 mm and 100 mm, for example substantially equal to 80 mm, which means that the elastic band 40 can be stretched to a length between 180 mm and 300 mm, for example 240 mm, before breaking. The elastic band 40, for example, has a width of between 15 mm and 25 mm, for example 20 mm. The elastic band 40 is made up of natural rubber and polyester (PES) fibers, for example, with the proportion of natural rubber fibers being greater than that of PES fibers. According to one embodiment, the proportion of PES is substantially between 40 and 50% and the proportion of natural rubber is substantially between 50% and 60%, for example 44% PES and 56% natural rubber.

As shown in FIGS. 4 to 6, the elastic band 40 is, for example, engaged in a slot 42 of a rod 44 and its two ends 46 are fastened to a fastening element 48.

The rod 44 is fastened to the covering element 36 in the vicinity of its front edge 38 and extends along the front edge 38 in the transverse direction. More particularly, the rod 44 is, for example, sewn into a bead of the covering element 36 forming the front edge 38 of the lining element 36, as shown in FIG. 4.

In the embodiment shown in FIGS. 4 to 6, the covering element 36 is fastened to the frame 6 by two elastic bands 40, each fixed near one end of the front edge 38 of the covering element 36 in the transverse direction. In this way, the two elastic bands 40 are spaced apart in the transverse direction. According to this embodiment, the rod 44 comprises two slots 42 each extending to the transverse ends of the rod 44, as seen in FIGS. 5 and 6, each elastic band 40 passing through one of the slots 42.

According to the embodiment shown in FIGS. 4 and 5, the fastening element 48 is formed by a profile 50 fastened by fastening pins 52 to the rear edge 32 of the frame 6. When the covering element 36 is fastened to the frame 6 by two elastic bands 40, each elastic band 40 is fastened to the frame 6 by a profile 50, meaning that two profiles 50 are fastened to the rear edge 32 of the frame 6. The or each profile 50 is formed by a substantially rectangular plate extending mainly in the transverse direction and the two ends 46 of the elastic band 40 are fastened, for example sewn, to an upper face of the profile 50 and a lower face of the profile 50, opposite the upper face, is applied against the frame 6, as seen in FIG. 4. In the vicinity of its transverse ends, the profile 50 comprises two through-holes 54 opening into the top face and the bottom face, the fastening pins 52 passing through the holes 54 to fasten the profile 50 to the frame 50. The fastening pins 52 are, for example, pine tree clips anchored in the metal plate forming the frame 6. The profile 50 is made of a rigid material capable of withstanding the restoring force exerted by the elastic band 40. In this way, the profile 50 remains firmly fastened to the frame 6 even when subjected to the restoring force of the elastic band 40.

Alternatively, the or each elastic band 40 is fastened directly to the frame 6 by at least one fastening pin 52, such as a pine tree clip. In this case, the fastening pin 52 passes through the elastic band 40 and is anchored in the frame 6 to secure the end of the elastic band 40 directly to the frame 6. The elastic band 40, for example, is fastened to the frame by one, two or three fastening pins 52.

The distance d between the centers of the ends of the elastic bands 40 fastened to the frame 6, shown in FIG. 4, is, for example, substantially between 200 mm and 285 mm. More specifically, when the elastic bands 40 are fastened to the frame 6 via profiles 50, the distance d is between 200 mm and 250 mm, and when the elastic bands 40 are fastened to the frame 6 directly via fastening pins 52, the distance d is between 250 mm and 285 mm.

In another embodiment shown in FIG. 6, fastening element 48 is formed by a rod 56 extending in the transverse direction. Thus, when the covering element 36 is fastened to the frame 6 by two elastic bands 40, each elastic band 40 is fastened to the frame 6 by the same fastening element 48 formed by the rod 56. The ends 46 of the elastic bands 40, for example, are sewn close to the transverse ends of the rod 56. For example, the rod 56 is fastened to the rail(s) used to move the carriage 30 of the movable sitting part 40. Fastening the elastic bands 50 to the rod 56 makes the connection between the elastic bands 40 and the frame 6 more robust, as the rod 56 withstands the stresses of the elastic bands 40 better than the profiles 50 when the elastic bands 40 are stretched by the covering element 36 in the deployed position.

Whatever the embodiment, the fastening element(s) 48 for fastening the elastic band(s) 40 to the frame 6 is (are) fastened to the frame 6 in such a way that the covering element 36 extends substantially in the elevation direction against the front edge 18 of the main sitting part 2 when the covering element 36 is in the retracted position, as more particularly visible in FIG. 3. In the retracted position, the elastic band(s) 40 also extend(s) substantially in the elevation direction or slightly rearwards so that the ends 46 are fastened to the frame 6 substantially in line with the front edge 18 of the main sitting part 2 in the elevation direction, as shown in FIGS. 3 and 4.

Thus, when the covering element 36 is moved from the deployed position to the retracted position when the movable sitting part 4 is moved from the extended position to the retracted position, the elastic band(s) 40, due to the restoring force they exert on the covering element 36, return the covering element 36 to the retracted position and press the covering element 36 against the front edge 18 of the main sitting part 2, thus ensuring that the covering element 36 is correctly positioned in the retracted position, in particular so that the movable sitting part 4 can reach its retracted position without difficulty.

In this way, the movement of the covering element 36 towards the retracted position is simplified and reliable, and the connection between the covering element 36 and the movable sitting part 4 can also be simplified as the movement of the covering element 36 towards the retracted position is mainly achieved by the restoring force of the elastic band(s) 40, rather than by a complex connection device between the covering element 36 and the movable sitting part 4.

The invention claimed is:

1. A vehicle seat sitting element comprising a main sitting part and a movable sitting part, movable relative to the main sitting part along an extension direction between a retracted position, wherein the movable sitting part extends against the main sitting part, and an extended position, wherein the movable sitting part is spaced apart from the main sitting part along the extension direction, said movable sitting part sliding on a frame between the retracted position and the extended position, said frame extending in the extension direction between a rear edge facing the main sitting part and a front edge facing the movable sitting part and spaced from the main sitting part in the extension direction, the sitting element further comprising a covering element extending between the main sitting part and the movable sitting part, said covering element being movable between a retracted position, wherein the covering element is folded between the main sitting part and the movable sitting part when the movable sitting part is in the retracted position, and a deployed position, wherein the covering element fills the space between the main sitting part and the movable sitting part in the extension direction when the movable sitting part is in the extended position, wherein the covering element is fastened to the frame, in the vicinity of the rear edge of said frame, by at least one elastic band, said elastic band exerting a restoring force on the covering element towards the retracted position, when said covering element is in the deployed position, wherein the elastic band is engaged in a slot of a rod fixed to the covering element and is fixed by its two ends to a fastening element, said fastening element being fastened to the frame.

2. The vehicle seat sitting element according to claim 1, wherein the covering element extends between a rear edge integral with the main sitting part and a front edge integral with the movable sitting part, the elastic band being fastened to the covering element in the vicinity of the front edge of the covering element and being elastically stretched when the covering element moves from the retracted position to the deployed position.

3. The vehicle seat sitting element according to claim 1, wherein the elastic band is fastened directly to the frame by at least one fastening pin passing through the elastic band and anchored in the frame.

4. The vehicle seat sitting element according to claim 1, wherein the elastic band has an elongation at break greater than or equal to 120%.

5. The vehicle seat sitting element according to claim 1, wherein the fastening element is formed by a profile extending between two transverse edges, the ends of the elastic band being fastened to an upper face of said profile between the transverse edges, said profile being fastened to the frame by fastening pins passing through the profile at its transverse edges, a lower face of the profile, opposite the upper face, being applied against the frame.

6. The vehicle seat sitting element according to claim 1, further comprising a second elastic band, wherein the covering element is fastened to the frame by the two elastic bands spaced apart in a transverse direction substantially perpendicular to the extension direction.

7. The vehicle seat sitting element according to claim 6, wherein the two elastic bands are attached to the same fastening element, said fastening element being formed by a rod fastened to the seat frame.

8. The vehicle seat sitting element according to claim 1, wherein the covering element is made of the same piece as a cover of the main sitting part, said covering element folding along a fold line extending between the cover and the covering element from the deployed position to the retracted position.

9. The vehicle seat according to claim 1, wherein the covering element is fastened to the movable sitting part so that movement of the movable sitting part from the retracted position to the extended position causes the covering element to move from the retracted position to the deployed position.

10. The vehicle seat according to claim 1, wherein the movable sitting part comprises a carriage mounted for translational movement on the frame, said carriage moving in the extension direction in a direction from the rear edge towards the front edge of the frame when the movable sitting part moves from the retracted position to the extended position.

11. A vehicle seat sitting element comprising a main sitting part and a movable sitting part, movable relative to the main sitting part along an extension direction between a retracted position, wherein the movable sitting part extends against the main sitting part, and an extended position, wherein the movable sitting part is spaced apart from the main sitting part along the extension direction, said movable sitting part sliding on a frame between the retracted position and the extended position, said frame extending in the extension direction between a rear edge facing the main sitting part and a front edge facing the movable sitting part and spaced from the main sitting part in the extension direction, the sitting element further comprising a covering element extending between the main sitting part and the movable sitting part, said covering element being movable between a retracted position, wherein the covering element is folded between the main sitting part and the movable sitting part when the movable sitting part is in the retracted position, and a deployed position, wherein the covering element fills the space between the main sitting part and the movable sitting part in the extension direction when the movable sitting part is in the extended position, wherein the covering element is fastened to the frame, in the vicinity of the rear edge of said frame, by at least two elastic bands, said elastic bands exerting a restoring force on the covering element towards the retracted position, when said covering element is in the deployed position, wherein the covering element is fastened to the frame by the elastic bands spaced apart in a transverse direction substantially perpendicular to the extension direction and wherein the elastic bands are attached to the same fastening element, said fastening element being formed by a rod fastened to the seat frame.

12. A vehicle seat sitting element comprising a main sitting part and a movable sitting part, movable relative to the main sitting part along an extension direction between a retracted position, wherein the movable sitting part extends against the main sitting part, and an extended position, wherein the movable sitting part is spaced apart from the main sitting part along the extension direction, said movable sitting part sliding on a frame between the retracted position and the extended position, said frame extending in the extension direction between a rear edge facing the main sitting part and a front edge facing the movable sitting part and spaced from the main sitting part in the extension direction, the sitting element further comprising a covering element extending between the main sitting part and the movable sitting part, said covering element being movable between a retracted position, wherein the covering element is folded between the main sitting part and the movable sitting part when the movable sitting part is in the retracted position, and a deployed position, wherein the covering element fills the space between the main sitting part and the movable sitting part in the extension direction when the movable sitting part is in the extended position, wherein the covering element is fastened to the frame, in the vicinity of the rear edge of said frame, by at least one elastic band, said elastic band exerting a restoring force on the covering element towards the retracted position, when said covering element is in the deployed position, wherein the elastic band has an elongation at break greater than or equal to 120%.

* * * * *